No. 650,228.

G. CATTANEO.
WHEEL BRAKE.
(Application filed Oct. 28, 1899.)

Patented May 22, 1900.

(No Model.)

3 Sheets—Sheet 3.

Witnesses:
Anton Gloetzner
N. Mitchell

Inventor
Gioacchino Cattaneo
by Max Georgii
his attorney

THE NORRIS PETERS CO., PHOTO-LITHO., WASHINGTON, D. C.

UNITED STATES PATENT OFFICE.

GIOACCHINO CATTANEO, OF GENOA, ITALY.

WHEEL-BRAKE.

SPECIFICATION forming part of Letters Patent No. 650,228, dated May 22, 1900.

Application filed October 28, 1899. Serial No. 735,113. (No model.)

*To all whom it may concern:*

Be it known that I, GIOACCHINO CATTANEO, a subject of the King of Italy, residing at 5 Via Aparotti, Genoa, Italy, have invented certain new and useful Improvements in Wheel-Brakes; and I do hereby declare the following to be a full, clear, and exact description of the invention, such as will enable others skilled in the art to which it appertains to make and use the same.

My invention refers to brakes for cycles, motor-cars, and all descriptions of carriages whose wheels are fitted with india-rubber tires.

The drawings annexed to this specification show my improved brake acting on the front wheel of a bicycle; but the same may as well be caused to act upon the rear wheel thereof or upon the wheels of any other vehicles, specially those fitted with india-rubber tires, like motor-cars, &c.

Figure 1:
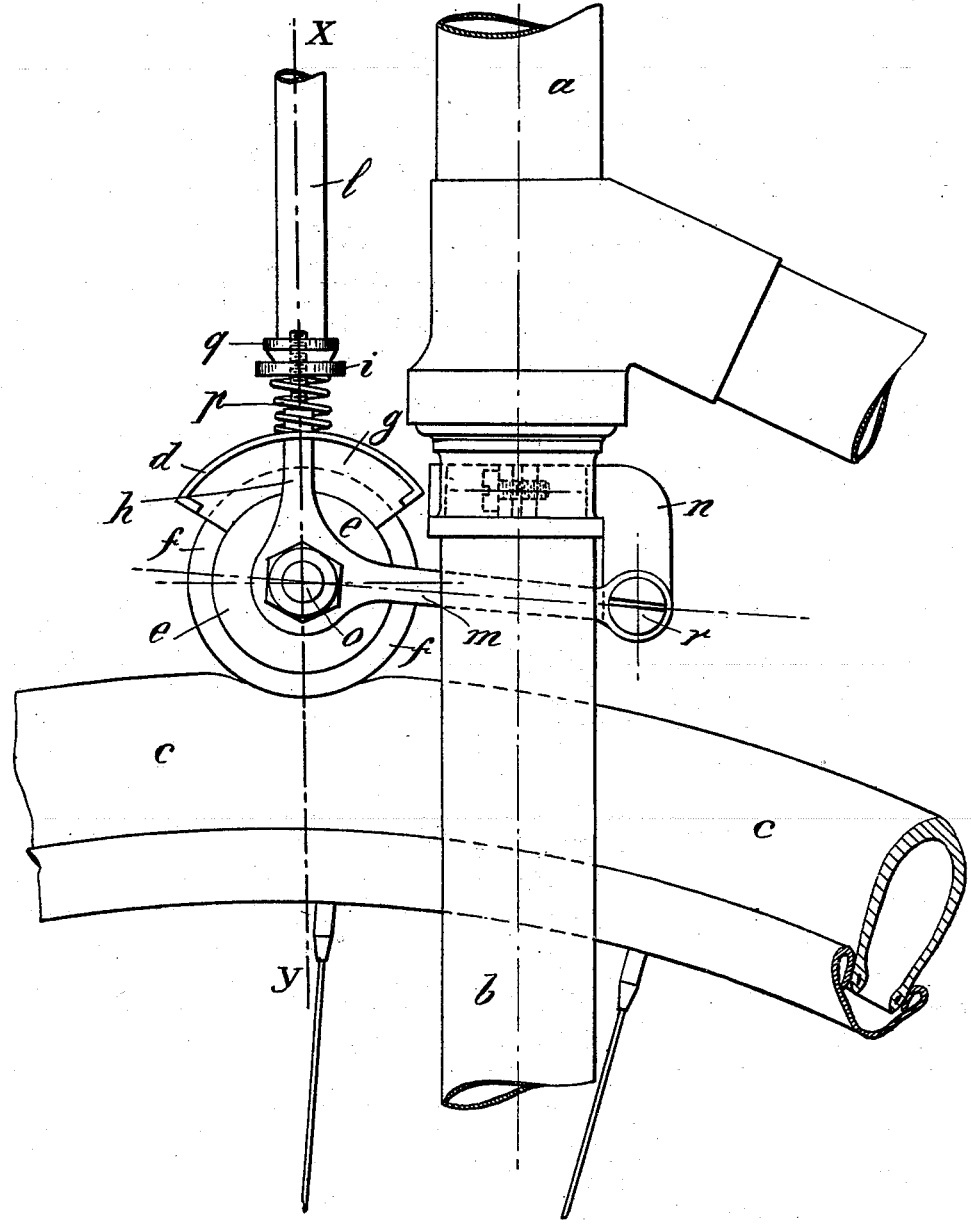
Figure 2:
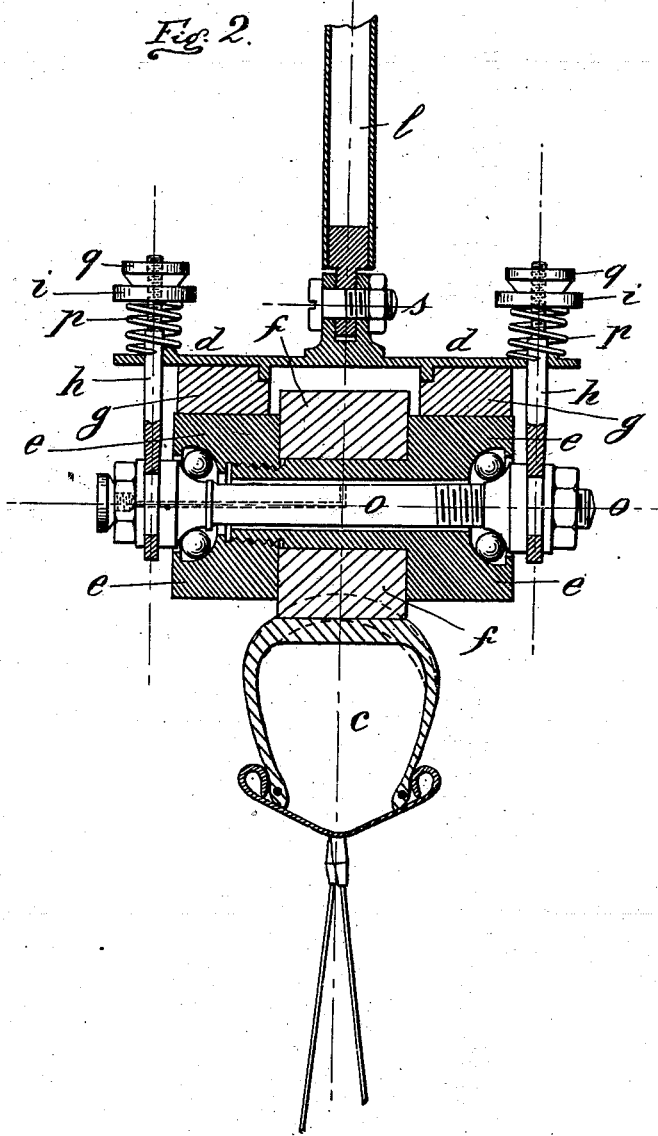
Figure 3:
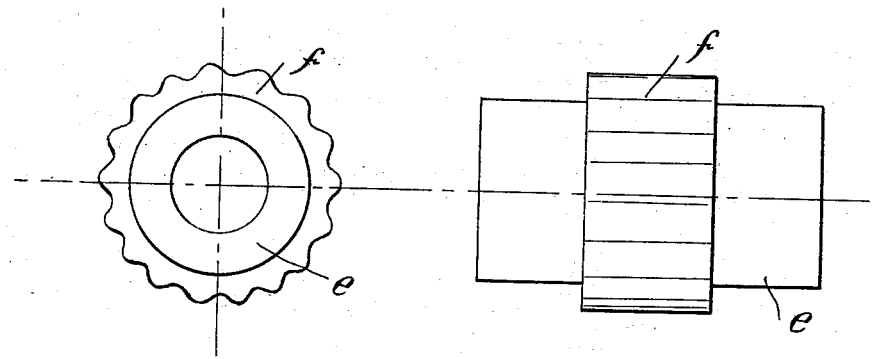
Figure 4:
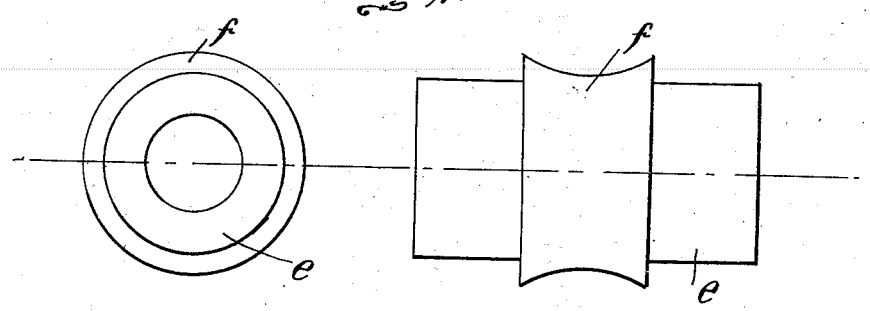

Figures 1 and 2 are respectively a side elevation and a section on line X Y, Fig. 1, of a brake applied to the front wheel of an ordinary bicycle. Figs. 3 and 4 refer to modified forms of the revolving roller.

In said drawings, $a$ shows the steering-tube, $b$ the front fork, and $c$ the tire of the front wheel. The sector-shaped box $d$, wherein the rubbing-blocks $g$ are seated, is connected through the pivot $s$ to the brake-rod $l$, which latter can be pressed downward against the tire, as in the ordinary bicycles, and automatically released by a spring. (Not shown in the drawings, as its arrangement does not differ from those in common use.) Pin $o$ is carried by a double crank-lever $m$ $h$, whose arm $m$ is pivoted at $r$ on the collar $n$, while arm $h$, fitted with screw-threads on its upper extremity, goes through the box $d$. On pin $o$ is mounted, by means of two ball-bearings, roller $e f$, whose lateral parts $e$ are intended to come into contact with the rubbing-blocks $g$, while the middle part $f$, which can be easily exchanged, is intended to press against the tire $c$. Nuts $i$ and lock-nuts $q$, acting through the springs $p$, admit of the initial pressure exerted by the rubbing-blocks $g$ on the roller sides $e$ being controlled at will. In order to obtain the desired result, the adherence between $f$ and $c$ must be greater than that existing between $e$ and $g$. To that effect a free control is left both on the initial pressure between $e$ and $g$, which may be varied at will by nuts $i$ and lock-nuts $q$ independently of the extra pressure exerted by the brake-rod $l$, as well as on the choice of the material and the degree of smoothness of the surfaces which are intended to come into contact with each other.

The middle part $f$ of the revolving roller may be made of rubber, leather, metal, or any other convenient material and may also be fitted with indentations, corrugations, and the like, (see Fig. 3,) or so shaped as to embrace the tire in cross-section, as shown by Fig. 4, all of these arrangements being intended to cause the revolving roller to strictly adhere to the tire. The rubbing-blocks $g$ may on their turn be made of wood, leather, or other substances chosen with the view of obtaining less adherence between them and the lateral parts $e$ of the revolving roller than that which arises between $f$ and $c$. Under these circumstances, the cycle being in motion, the brake-rod $l$ being pressed down, the initial pressure between $e$ and $g$ being properly controlled and being increased by the amount of the pressure exerted by the revolving roller on the wheel-tire, the middle part $f$ of the roller $e f$ will roll on the tire without slipping, while the side ends $e$ of the roller will slide along the brake-blocks $g$ and be acted upon by their braking action, which will be transferred indirectly to the tire, no slipping taking place along the contact-line of the tire $c$ and revolving roller $f$.

Having thus described my invention and how the same is to be put into practice, what I desire to claim and protect by Letters Patent is—

1. In a brake of the character described, the combination of a brake-rod, a yoke connected to the brake-rod and having an aperture in each extremity, a roller adapted to engage the tire by its middle portion, a pair of levers having said roller journaled between them, the free extremity of each of said levers projecting through one of said apertures in said yoke, a nut on the free end of each of said projecting extremities, a spring between each of said nuts and the yoke, blocks mounted on said yoke, one on each side of its middle portion and adapted to bear on the roller on each side of its tire-engaging portion, and means for guiding said roller to and from the tire, substantially as set forth.

2. In a brake of the character described, the combination of a brake-rod, a yoke connected to the brake-rod and having an aperture in each extremity, a roller having an enlarged middle portion adapted to engage the tire, a pair of levers having said roller journaled between them, a free extremity of each of said levers projecting through one of said apertures in said yoke, a nut on the free end of each of said projecting extremities, a spring between each said nut and the yoke, blocks mounted on said yoke, one on each side of its enlarged middle portion and adapted to bear on the roller on each side of said enlarged middle portion, and means for guiding said roller to and from the tire, substantially as set forth.

3. In a brake of the character described, the combination of a brake-rod, a yoke connected to the brake-rod and having an aperture in each extremity, a roller adapted to engage the tire by its middle portion, a pair of levers having said roller journaled between them, the free extremity of each of said levers projecting through one of said apertures in said yoke, a jam-nut on the free end of each of said projecting extremities, a spiral spring surrounding each of said extremities and being interposed between said jam-nuts and said yoke, blocks mounted on said yoke, one on each side of its said middle portion and adapted to bear on the roller on each side of its said tire-engaging portion, and means for guiding said roller to and from the tire, substantially as set forth.

In testimony whereof I affix my signature in presence of two witnesses.

GIOACCHINO CATTANEO.

Witnesses:
 ANDREA BRINK,
 AFFREDI PIETRO.